March 14, 1950 D. W. COLE 2,500,347

RELAY CONTROL CIRCUITS FOR SIGNAL-SEEKING RECEIVERS

Filed June 7, 1946 2 Sheets-Sheet 1

INVENTOR

Dana W. Cole

BY C. A. Burton

ATTORNEY

March 14, 1950 D. W. COLE 2,500,347

RELAY CONTROL CIRCUITS FOR SIGNAL-SEEKING RECEIVERS

Filed June 7, 1946 2 Sheets-Sheet 2

INVENTOR
Dana W. Cole
BY
C. C. Norton
ATTORNEY

Patented Mar. 14, 1950

2,500,347

UNITED STATES PATENT OFFICE 2,500,347

RELAY CONTROL CIRCUITS FOR SIGNAL-SEEKING RECEIVERS

Dana W. Cole, Buffalo, N. Y., assignor to Colonial Radio Corporation, Buffalo, N. Y.

Application June 7, 1946, Serial No. 674,966

9 Claims. (Cl. 250—40)

Figure 1:
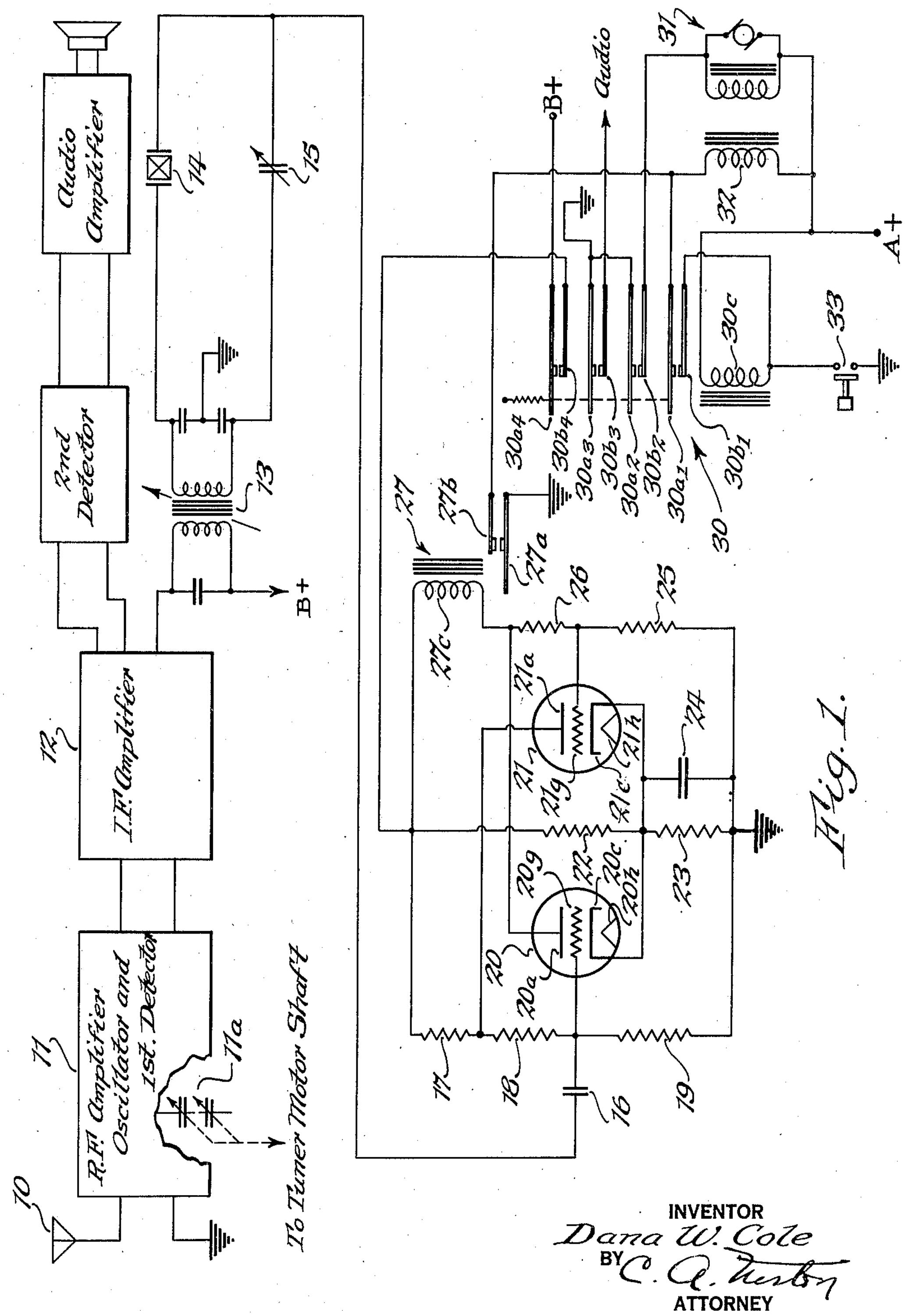

This invention relates to relay control circuits for signal-seeking receivers.

For the purposes of this description, a signal-seeking receiver is one in which the tuning apparatus is driven by a source of power such as a motor and scans the tuning spectrum until an incoming signal of predetermined strength is tuned in. The reception of this signal actuates a control circuit which de-energizes the tuner drive, and the receiver will thus remain tuned to the incoming signal until the operator puts it into operation to select another station, at which time it will resume scanning the spectrum and will again stop itself when another incoming signal of predetermined strength is tuned in.

One of the difficulties heretofore encountered in such receivers is that, because it takes a finite interval of time to operate the control circuits after the incoming signal is tuned in, the receiver may pass the position for best tuning before the tuning apparatus actually comes to rest, and this has required the use of various correcting arrangements.

Another difficulty is that, because of the time interval required for the control circuits to operate, the tuning instrumentality cannot scan too fast. If it is attempted to operate the tuning instrumentality too fast, the receiver may tune through an incoming signal and the signal may be completely tuned out before the relays have time to operate.

It is an object of this invention to provide control circuits for signal-seeking receivers in which the length of time required for the relays to operate is very substantially decreased.

It is a further object of this invention to provide such control circuits which operate in response to an incoming signal pulse of considerably shorter time duration than was heretofore possible.

It is a further object of this invention to provide control circuits which are sufficiently quick acting to permit the scanning speed to be considerably increased.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which Fig. 1 is a circuit diagram of a signal-seeking receiver in accordance with my invention, and Fig. 2 is a circuit diagram of a modified form of control circuit which may be used with the apparatus of Fig. 1 in place of the control apparatus shown in Fig. 1.

In the drawing, like reference numerals designate like parts in both figures.

Figure 2:
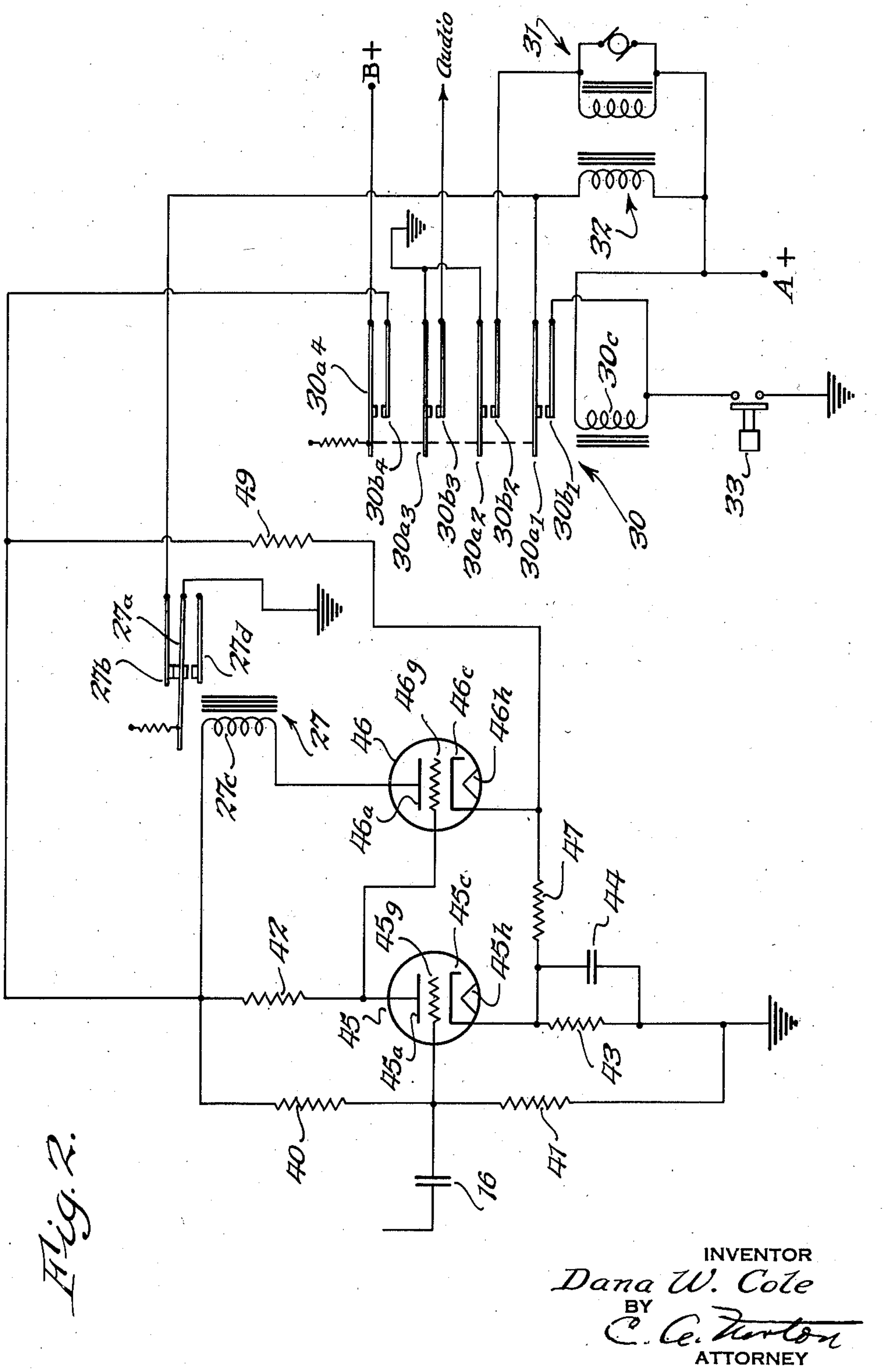

Referring now more particularly to Fig. 1, 10 designates the antenna, which may be coupled to a radio frequency amplifier, oscillator and first detector, all indicated diagrammatically by numeral 11. The receiver herein shown is of the superheterodyne type, and the output of the first detector may be supplied to the intermediate frequency amplifier diagrammatically indicated as 12.

A portion of the output of intermediate frequency amplifier 12 may be passed through tuned coupling circuit 13 and through a crystal selecting circuit including variable condenser 15 and piezo-electric crystal 14, and through condenser 16 to the control circuit. Preferably the selectivity of the crystal circuit is made quite sharp and may be of the order of 500 to 1000 cycles in band width, and this circuit will be tuned to the center frequency of the I. F. band.

The portion of the intermediate frequency amplifier output impressed on the control circuit is used only for stopping the receiver tuning at the desired point, and the rest of the output of intermediate frequency amplifier 12 may be supplied to a second detector and audio amplifier and to a loud speaker in the usual manner.

The control circuit in the embodiment shown in Fig. 1 comprises resistances 17, 18, and 19 connected in series with each other, with the output terminal of condenser 16 connected to the common point of resistors 18 and 19 and to the control electrode 20*g* of tube 20, which may be a hard tube having cathode 20*c*, heater 20*h*, control electrode 20*g*, and anode 20*a*. Cathode 20*c* may be connected through resistance 23, by-passed by condenser 24, to the opposite end of resistance 19 from that connected to control electrode 20*g*.

A second tube 21 may be provided, likewise having cathode 21*c*, heater 21*h*, control electrode 21*g*, and anode 21*a*. The anode may be connected to the common point of resistors 17 and 18, the control electrode to the common point of resistors 25 and 26, the opposite end of resistor 25 being connected to the common point of resistors 19 and 23, and the upper end of resistor 26 being connected to anode 20*a*.

Cathodes 20*c* and 21*c* may be connected together and through resistance 22 to the common point of resistor 17 and the actuating coil 27c of relay 27. The other end of relay winding 27c may be connected to anode 20a of tube 20 and to the upper end of resistor 26. Relay 27 may have armature 27a and fixed contact 27b, and when winding 27c is energized, armature 27a is closed against fixed contact 27b.

Preferably armature 27a is grounded. A second relay 30 is also provided, this being a multiple type relay having actuating winding 30c, armatures 30a1, 30a2, 30a3, and 30a4, mechanically tied together, and fixed contacts 30b1, 30b2, 30b3, and 30b4.

The positive side of the source of B voltage may be connected to armature 30a4, the negative side of the B source being grounded, and when relay 30 is in energized position, B voltage will be applied through fixed contact 30b4 to anodes 20a and 21a through resistor 17 and through actuating winding 27c of relay 27.

Armature 30a3 and fixed contact 30b3 may be connected to mute the audio system by connecting the high potential side to ground when relay 30 is energized. Armature 30a2 and fixed contact 30b2 serve to energize tuner motor 31 and the clutch magnet which will ordinarily be provided, to make a driving connection between tuner motor 31 and the tuning instrumentality 11a (shown as a gang condenser, although other tuners may be used), when the receiver is to be tuned.

As stated, when relay 30 is closed, these circuits are energized from the source indicated as +A, the negative side of which is customarily grounded, through motor and clutch magnet 31—32 in parallel and through fixed contact 30b2 and armature 30a2 to ground.

The remaining contacts 30b1 and 30a1 serve to lock in relay 30 under control of relay 27, by providing for current flow from the source A+ through winding 30c, contact 30b1, and armature 30a1 to relay contact 27b and armature 27a to ground when both relays 27 and 30 are closed.

Opening of relay 27, as will be seen, causes the energizing circuit of relay 30 to open and all the armatures move to open position, interrupting the +B supply to tubes 20 and 21, opening the audio muting circuit, opening the tuner motor and clutch magnet circuit, and opening the energizing circuit for relay 30.

The apparatus will remain in this condition until switch 33 is closed. This, as will be seen, closes an alternative circuit through relay winding 30c, actuates relay 30, and closes the circuits controlled thereby, setting the tuner to scanning the spectrum, applying plate voltage to tubes 20 and 21, and this condition will continue as long as switch 33 is held closed.

Supposing that the listener has the receiver turned on and wishes to select a station, he will close switch 33 for a moment, the tuning motor will be set in operation, and the receiver will start to scan the spectrum. When he removes his finger from switch 33, which may be a spring-restored push button, the apparatus will not stop scanning but will continue until a signal is tuned in.

The reason for this is that if the ratio of resistance 19 to that of resistance 25 is properly chosen, tube 20 will always be conducting, with tube 21 at cutoff, whenever plate voltage is applied, and provided that no radio frequency voltage is simultaneously applied to control electrode 20g. Thus, relay 27 will be energized, and as long as this is energized, relay 30 will be energized, the motor circuit will be closed, and the tuner will scan.

When, however, it tunes in an incoming signal of predetermined strength, a radio frequency voltage is applied to the control electrode 20 of tube 20, and this voltage is rectified and makes the control electrode become more negative with respect to its cathode, thereby reducing its plate current. The potential of the control electrode 21g of tube 21 will simultaneously move in a positive direction with respect to its cathode on account of the decreasing voltage drop across the relay winding 27, thus increasing plate current of tube 21.

This further increases the negative bias on control electrode 20g of tube 20, still further reducing the plate current and the effect is cumulative and builds up rapidly to the point where tube 21 draws its maximum plate current and tube 20 goes to cutoff, thereby de-energizing relay 27, which opens, in turn de-energizing relay 30 allowing its several contacts to open, and stopping the tuner motor and declutching it from the tuning instrumentality.

The circuits will remain in this condition until switch 33 is manually closed to start the tuner scanning. The advantage of this arrangement is that it permits very rapid scanning of the tuning spectrum, since a radio frequency pulse applied to the control electrode of tube 20 will cause this action, even though the pulse itself is much less in time duration than the time required for the relays to operate; that is to say, a very much shorter pulse of radio frequency energy on control electrode 20g triggers the circuit off, and the action goes ahead to completion, although the pulse by that time may have stopped.

A somewhat modified form of control circuit is shown in Fig. 2, in which, since the apparatus ahead of condenser 16 is the same as that of Fig. 1, it is omitted for simplicity. The output side of condenser 16 may now be connected to the common point of resistors 40 and 41, the lower end of resistor 41 being grounded and also connected through resistor 43 shunted by by-pass condenser 44 to cathode 45c of tube 45, which may comprise cathode 45c, heater 45h, control electrode 45g, and anode 45a. Anode 45a may be connected through resistor 42 to the upper end of resistor 40, thence through relay contact 30b4 and armature 30a4 to +B, as before.

Tube 46 may have cathode 46c, control electrode 46g, and anode 46a. Cathode 46c may be connected through resistor 47 to cathode 45c, control electrode 46g is connected to anode 45a, and anode 46a is connected through winding 27c of relay 27 to the common point of resistors 40 and 42 and through resistor 49 to cathode 46c.

With this circuit, if the ratio of resistance 40 to that of resistance 41 is properly chosen, tube 45 will draw full plate current on the application of plate voltage, again provided that a high radio frequency voltage is not applied to control electrode 45g. By similar choice of the values of the voltage-divider resistors 49, 47 and 43, which are connected across the +B supply, tube 46 is not conducting and relay 27 is, therefore, closed on contact 27b closing the energizing circuit for relay 30 and applying +B voltage to the anodes of tubes 45 and 46. The tuner motor circuit will, therefore, be closed and the motor clutched to the tuning instrumentality, and the tuner will scan.

If, now, an incoming signal is received, a radio frequency voltage is applied to control electrode 45g, rectification causing the potential of control electrode 45g to move in a negative direction with respect to its cathode, thereby reducing the plate current of tube 45. The control electrode voltage on tube 46 will then become more positive with respect to its cathode because of the decrease in voltage drop through resistor 42.

This increases the plate current flowing through tube 46, the cathode bias on tube 45 will increase in a direction to make control electrode 45g more negative with respect to the cathode, causing still further reduction in plate current of tube 45. The effect is cumulative and builds up very rapidly to the point where tube 46 quickly passes sufficient current to energize relay 27, and this condition will continue as long as plate voltage is applied.

When relay 27 is energized, the armature moves to its contact 27d, opening the holding circuit for relay 30, permitting this relay to open, removing B voltage from anodes 45a and 46a, removing the mute from the audio system, and de-energizing the motor and clutch mechanism, and the receiver will remain tuned to the station which caused it to stop scanning.

When plate voltage is again applied to anodes 45a and 46c as by closure of push button 33, tube 45 is again in control. Tube 46 is nonconductive, relay 27 is closed on its contact 27b, the motor circuit is established, and likewise the clutch magnet is energized and the receiver will scan until another incoming signal of predetermined strength is tuned in.

The circuits herein described have a distinct advantage in that once the circuits have been triggered by a carrier pulse, the relay tube will continue to draw current even though the carrier pulse has dropped to zero.

In signal-seeking systems of the prior art known to applicant, the plate current of the relay tube is a direct time function of the carrier pulse and the pulse must, therefore, be of sufficient duration to permit the relay to positively close or open. This limits the scanning speed to a value such that the relays have time to operate, whereas with the circuits herein described, the carrier pulse duration need only be long enough to trigger the circuit, and this time is only a small fraction of the time required for the relay to operate.

Thus, using circuits according to my invention, the scanning speed may be considerably increased without danger of the scanning being too fast for the control system to respond and stop the scanning.

The circuits of tubes 20 and 21, in Fig. 1, and 45 and 46, in Fig. 2, are of the class called "flip-flop," and it should be understood that other circuits of this class may be employed in place of those shown.

In the specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. In a signal-seeking receiver, in combination, a tuning instrumentality which is variable to adjust the tuning of said receiver to desired wave signals, power-operated means energizable to drive said tuning instrumentality to tune said receiver over a predetermined range of wave-signal frequencies, and a control system responsive to a predetermined amplitude of a received signal translated through at least a portion of said receiver for deenergizing said power-operated means to terminate variation thereby of said tuning instrumentality, said system including a flip-flop circuit having an input circuit to which is applied a control potential of amplitude varying with the intensity of said translated signal and having a control circuit effective to control the energization of said power-operated means.

2. In a signal-seeking receiver, in combination, a tuning instrumentality which is variable to adjust the tuning of said receiver to desired wave signals, power-operated means energizable to drive said tuning instrumentality to tune said receiver over a predetermined range of wave-signal frequencies, and a control system responsive to a predetermined amplitude of a received signal translated through at least a portion of said receiver for deenergizing said power-operated means to terminate variation thereby of said tuning instrumentality, said system including a control arrangement having a first and a second operating condition and including means for providing rapid transition from either of said operating conditions to the other thereof, means responsive to said translated signal for causing said control arrangement to change from one to the other of said operating conditions thereof, and means responsive to said other operating condition for effecting deenergization of said power-operated means.

3. In a signal-seeking receiver, in combination, a tuning instrumentality which is variable to adjust the tuning of said receiver to desired wave signals, power-operated means energizable to drive said tuning instrumentality to tune said receiver over a predetermined range of wave-signal frequencies, and a control system responsive to a predetermined amplitude of a received signal translated through at least a portion of said receiver for deenergizing said power-operated means to terminate variation thereby of said tuning instrumentality, said system including a pair of thermionic-tube electrode structures having the electrodes thereof interconnected to provide a flip-flop circuit with an input circuit to which is applied a control potential of amplitude varying with the intensity of said translated signal and a control circuit effective to control the energization of said power-operated means.

4. In a signal-seeking receiver, in combination, a tuning instrumentality which is variable to adjust the tuning of said receiver to desired wave signals, power-operated means energizable to drive said tuning instrumentality to tune said receiver over a predetermined range of wave-signal frequencies, and a control system responsive to a predetermined amplitude of a received signal translated through at least a portion of said receiver for deenergizing said power-operated means to terminate variation thereby of said tuning instrumentality, said system including a pair of thermionic-tube electrode structures having the electrodes thereof interconnected to provide a control arrangement having a first and a second operating condition with rapid transition from either of said operating conditions to the other thereof, means responsive to said translated signal for causing said control arrangement to change from one to the other of said operating conditions thereof, and means responsive to said other operating condition for effecting deenergization of said power-operated means.

5. In a signal-seeking receiver, in combination, a tuning instrumentality which is variable to adjust the tuning of said receiver to desired wave signals, power-operated means energizable to drive said tuning instrumentality to tune said receiver over a predetermined range of wave-signal frequencies, and a control system responsive to a predetermined amplitude of a received signal translated through at least a portion of said receiver for deenergizing said power-operated means to terminate variation thereby of said tuning instrumentality, said system including a pair of vacuum-tube electrode structures each having an anode, a cathode and a control electrode with cross connections between the anode of one electrode structure and the control electrode of the other electrode structure to provide a flip-flop circuit with an input circuit to which is applied a control potential of amplitude varying with the intensity of said translated signal and a control circuit effective to control the energization of said power-operated means.

6. In a signal-seeking receiver, in combination, a tuning instrumentality which is variable to adjust the tuning of said receiver to desired wave signals, power-operated means energizable to drive said tuning instrumentality to tune said receiver over a predetermined range of wave-signal frequencies, and a control system responsive to a predetermined amplitude of a received signal translated through at least a portion of said receiver for deenergizing said power-operated means to terminate variation thereby of said tuning instrumentality, said system including a flip-flop circuit having an input circuit to which is applied a control potential of amplitude varying with the intensity of said translated signal and having an output circuit, and a relay included in said output circuit for energization thereby and including relay elements which are included in an energizing circuit of said power-operated means to control the energization thereof.

7. In a signal-seeking receiver, in combination, a tuning instrumentality which is variable to adjust the tuning of said receiver to desired wave signals, power-operated means energizable to drive said tuning instrumentality to tune said receiver over a predetermined range of wave-signal frequencies, and a control system responsive to a predetermined amplitude of a received signal translated through at least a portion of said receiver for deenergizing said power-operated means to terminate variation thereby of said tuning instrumentality, said system including a pair of vacuum-tube electrode structures each having an anode, a cathode and a control electrode with cross connections between the anode of each electrode structure and the control electrode of the other electrode structure to vary in opposite senses the conductivity of said electrode structures, the control electrodes of said structures being normally so biased that one electrode structure is conductive and the other is non-conductive, means responsive to said translated signal for reducing the conductivity of said one electrode structure, whereby a flip-flop action is produced substantially cutting off said one electrode structure and rendering said other electrode structure conductive, and means responsive to the state of conductivity of one of said electrode structures for effecting deenergization of said power-operated means.

8. In a signal-seeking receiver, in combination, a tuning instrumentality which is variable to adjust the tuning of said receiver to desired wave signals, power-operated means energizable to drive said tuning instrumentality to tune said receiver over a predetermined range of wave-signal frequencies, and a control system responsive to a predetermined amplitude of a received signal translated through at least a portion of said receiver for deenergizing said power-operated means to terminate variation thereby of said tuning instrumentality, said system including a pair of vacuum-tube electrode structures each having an anode, a cathode and a control electrode with cross connections between the anode of each electrode structure and the control electrode of the other electrode structure to vary in opposite senses the conductivity of said electrode structures, the control electrodes of said structures being normally so biased that one electrode structure is conductive and the other is non-conductive, means responsive to said translated signal for reducing the conductivity of said one electrode structure, whereby a flip-flop action is produced substantially cutting off said one electrode structure and rendering said other electrode structure conductive, and means responsive to the conductivity of said other electrode structure for effecting deenergization of said power-operated means.

9. In a superheterodyne type of signal-seeking receiver having an intermediate-frequency amplifier, in combination, a tuning instrumentality which is variable to adjust the tuning of said receiver to desired wave signals, power-operated means energizable to drive said tuning instrumentality to tune said receiver over a predetermined range of wave-signal frequencies, a piezoelectric crystal coupled to said amplifier and resonant substantially at the mean frequency thereof, and a control system responsive to a predetermined amplitude of a wave signal translated through said crystal for deenergizing said power-operated means to terminate variation thereby of said tuning instrumentality, said system including a flip-flop circuit having an input circuit to which is applied a control potential of amplitude varying with the intensity of said translated signal and having a control circuit effective to control the energization of said power-operated means.

DANA W. COLE.

REFERENCES CITED

The following references are of record in the file of this patent:

UNITED STATES PATENTS

| Number | Name | Date |
|---|---|---|
| 2,044,645 | Stapleton et al. | June 16, 1936 |
| 2,252,457 | Cockrell | Aug. 12, 1941 |
| 2,304,871 | Andrews | Dec. 15, 1942 |